Patented May 12, 1931

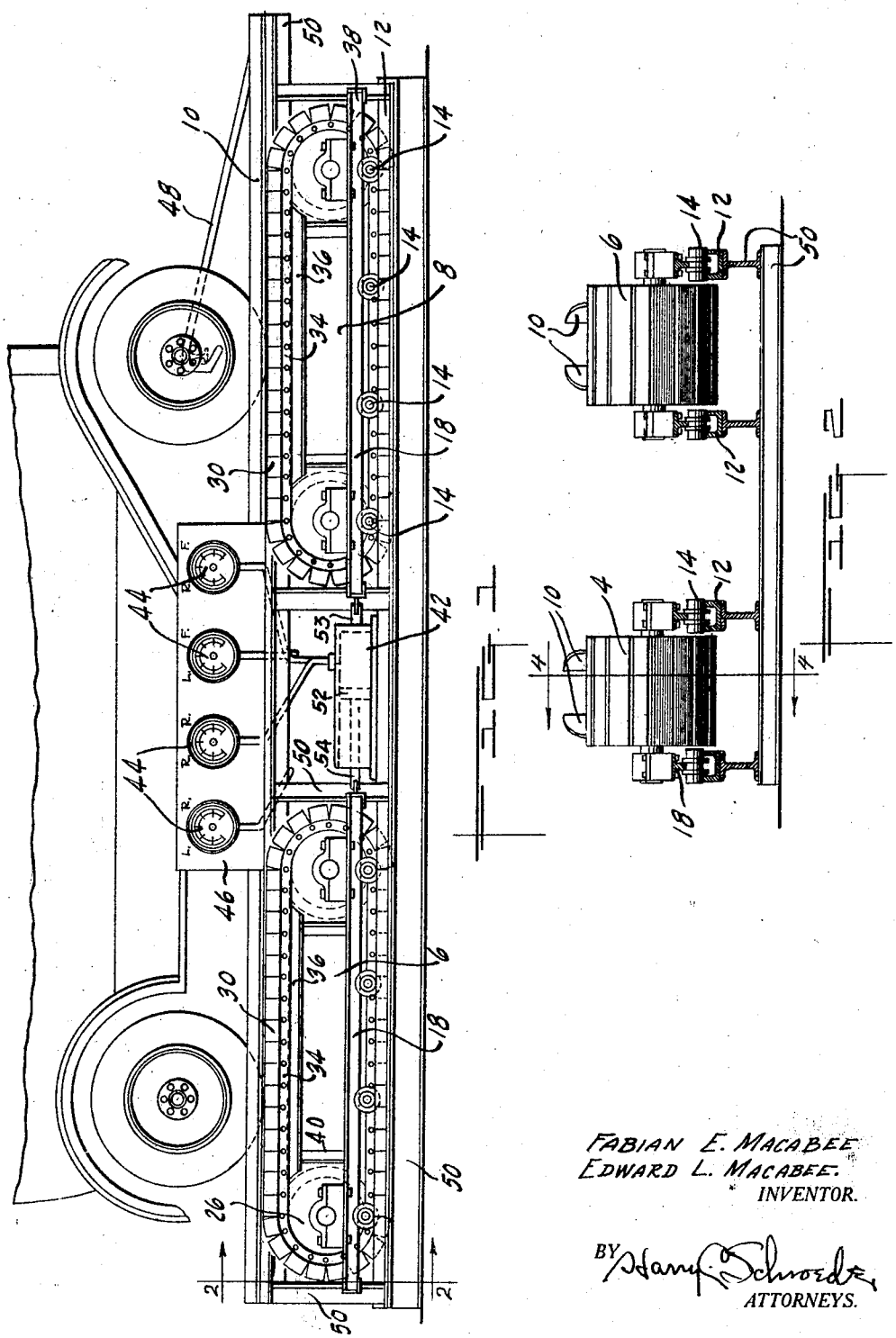

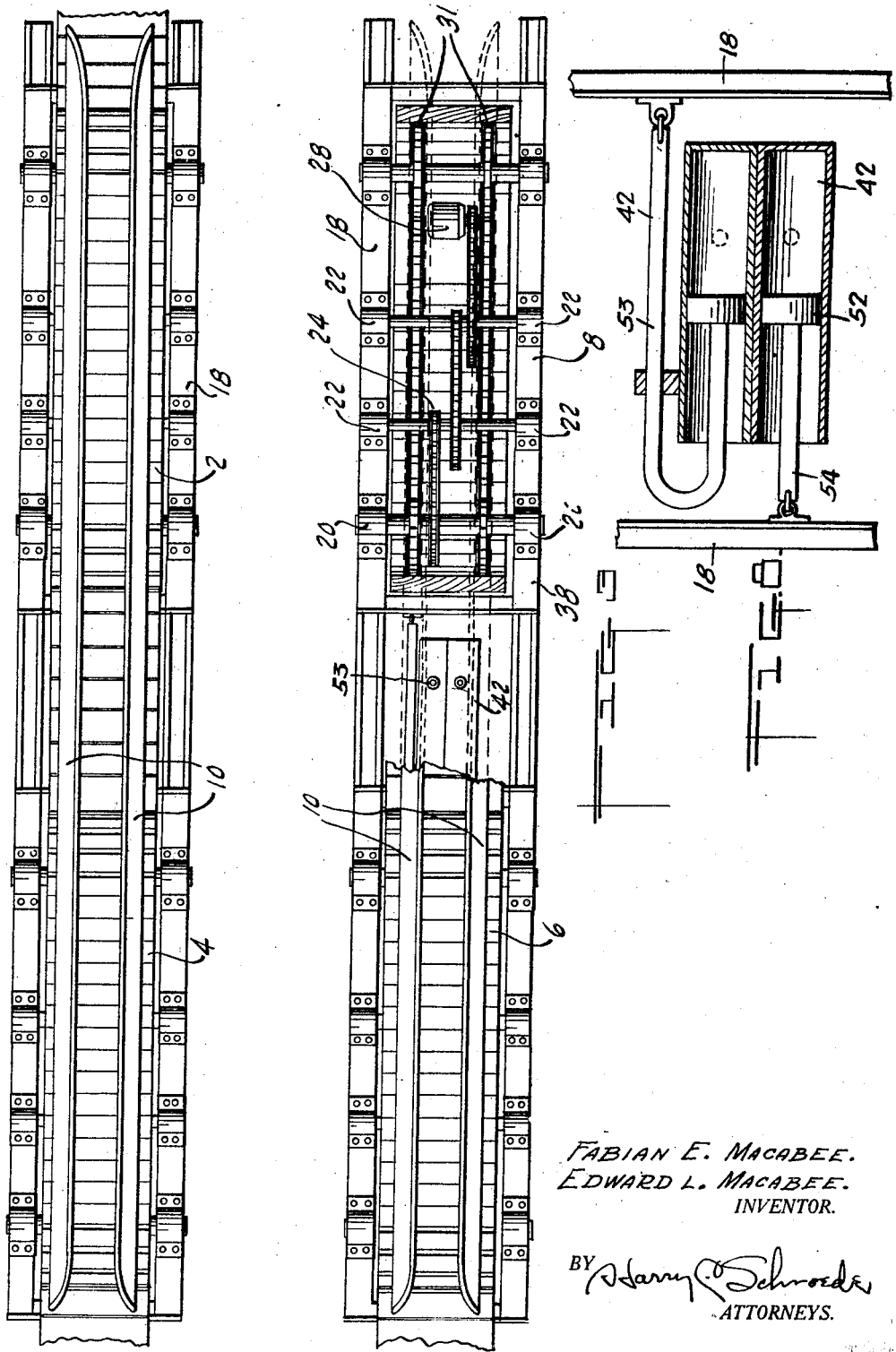

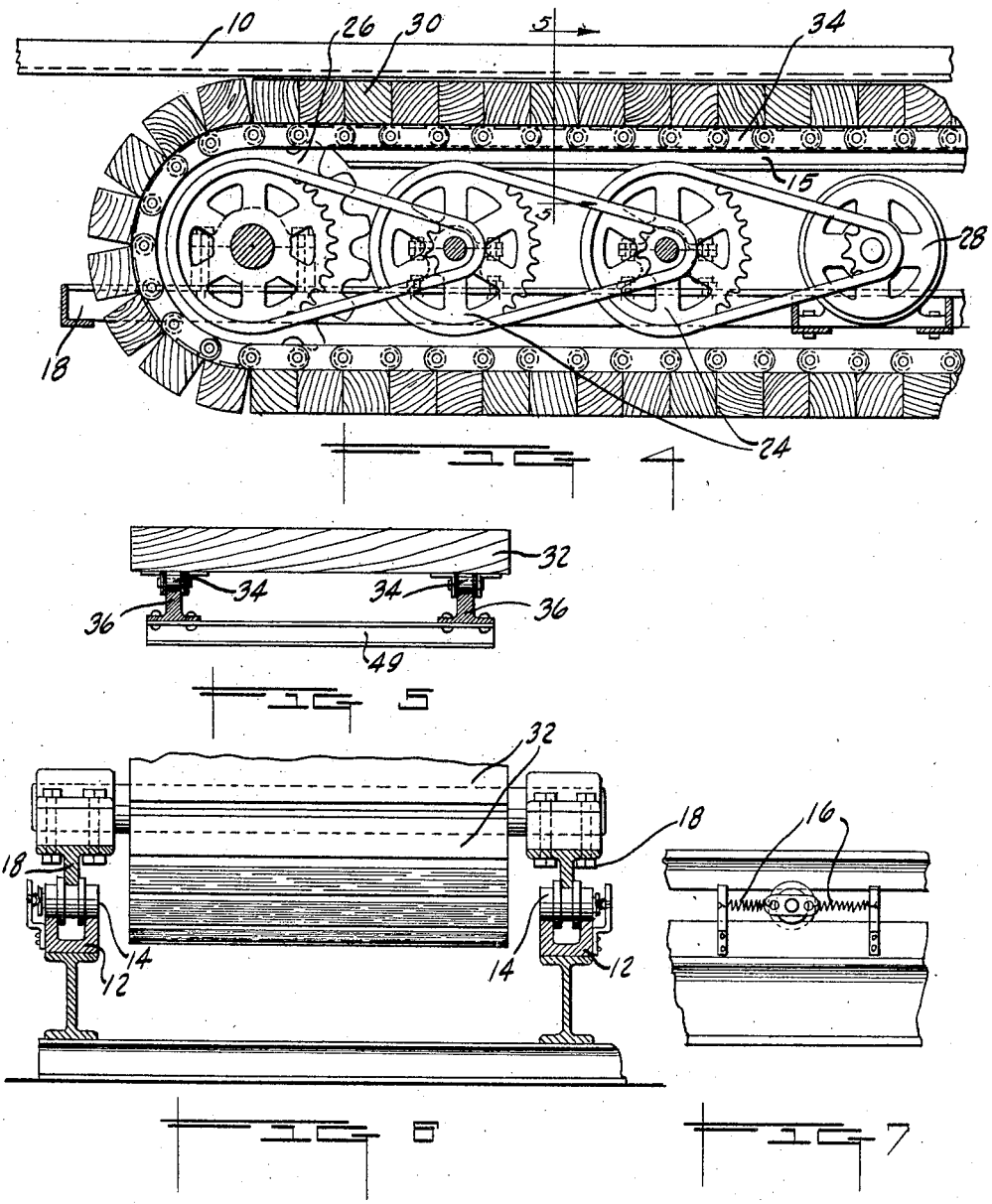

1,804,942

UNITED STATES PATENT OFFICE

FABIAN E. MACABEE AND EDWARD L. MACABEE, OF HAYWARD, CALIFORNIA, ASSIGNORS OF ONE-HALF TO HARRY C. SCHROEDER, OF OAKLAND, CALIFORNIA

BRAKE TESTING DEVICE

Application filed May 3, 1927. Serial No. 188,440.

The invention relates to testing machines, and particularly to machines for testing the brakes of land vehicles such as automobiles, wagons and the like.

The importance of accurately adjusted and efficient automobile brakes cannot be over emphasized, it being well known that a large percentage of accidents are directly attributable to faulty and improperly adjusted braking equipment. To make the braking of an automobile effective it is necessary that not only should the brakes have the proper gripping power, but also that the brakes applied to the various wheels should be so equalized that they will brake equally or compensate for various inequalities in the road surface in such way as to give an equal braking effect, since otherwise serious accidents may occur due to one brake gripping more strongly than another.

It is the object of this invention to provide a simple brake testing apparatus that may be installed in the usual service stations, and by which the efficiency of the brake as well as the torque supplied to the driving wheels may be determined.

In general, the invention consists in supplying four similar units in such operative relation that each one of the wheels of an automobile may be placed thereon and the efficiency of the brakes upon any one of the wheels determined. The units being exactly similar, the device consists merely in a duplication of units. Each unit comprises an endless belt or treadmill supported upon two large sprocket wheels driven by an electric motor through reduction gearing, the whole of this mechanism being mounted upon a movable frame within a main frame, the movable frame being connected to a hydraulic cylinder to which a force measuring means is attached for the purpose of determining the variations of pressure within that cylinder.

In order better and more clearly to describe the invention, we make reference to the accompanying drawings, in which a preferred embodiment of the invention is shown, and in which Fig. 1 shows a vertical plan view of the device assembled into operative position;

Fig. 2 shows an end view;

Fig. 3 shows a top plan view partially in section to show the relative position of the driving mechanism;

Fig. 4 shows a vertical section of one of the units to expose the reduction gearing used;

Fig. 5 shows one of the tread blocks with its supporting rollers and a portion of the supporting frame;

Fig. 6 shows an end plan view of one of the units;

Fig. 7 is a vertical plan view showing the spring tensioning means for maintaining the movable frame roller bearings in place and Figure 8 is a sectional plan view of the hydraulic cylinders actuated by the movement of the movable frame.

Referring more specifically to the drawings, reference numerals 50 show portions of the main frame which may be constructed from angle, channel, plate or bar iron. Upon this main frame are placed two guard rails 10 which serve to prevent the automobile being tested from running off the side of the device. Suitable approaches may be provided at each end of the device to permit placing the automobile thereon. Upon the main frame are placed series of parallel channel bars 12. These channel bars 12 serve as a support for roller bearings 14, said roller bearings being held in place by a spring tensioning means 16 shown in Fig. 7. Mounted on these roller bearings are T-shaped longitudinal bars 18 comprising a part of the movable frame 38. The longitudinal bars serve as supports for the bearings 20 and 22 of the shafts upon which the sprocket wheel reduction gears 24 and the main driving sprocket wheels 26 are placed. An angle iron support between the longitudinal members furnishes a base for the driving motor 28. Over the main driving sprocket wheels 26 is trained an endless belt or treadmill 30 composed of two endless chains 31 transversely connected by the members 32 formed of hardwood, or other similar material. Each chain 31 is provided at the connection between the various links with roller bearings 34 adapted to travel upon an inverted T-bar 36 which is supported within the movable frame 38 and held in proper position by angle bars 40, the purpose of this T-bar support being to prevent sagging of the treadmill and to aid in the elimination of friction in the device.

Each of the movable frames 38 is connected to a hydraulic pressure cylinder 42 to which is connected a pressure measuring gage 44. The movement of the movable frames 38 produces hydraulic pressure by reciprocating the plungers 52 in the respective cylinders 42. Inasmuch as all the frames 38 are moved in the same direction by the action of the brakes upon the wheels of the vehicle and upon the treadmills 30, the open ends of the cylinders 42 point in the same direction, and the compression stroke of the plungers is effected in the same direction. This necessitates the employment of a bent connecting rod 53 pivotally secured to the moving frames which are positioned at the closed end of said cylinders, while the moving frames, positioned opposite to the open end of said cylinders, are connected to their respective plungers by means of straight connecting rods 54 as clearly shown in Figure 8. It is to be understood that if hydraulic cylinders and plungers are used in which a connecting rod may be securely packed, the shape of the connecting rod will conform to the function and the action of the hydraulic cylinders. The cylinders with their attendant gages are preferably placed in the center of the device between the various units, the gages themselves being supported upon an instrument board 46 which may also carry the usual controlling and indicating devices for use in connection with the electric motor 28, and not shown in this drawing. A hook 48 or other fastening means is placed at the forward end of the device to serve as a securing means to prevent movement of the automobile upon the device.

The operation of the device may be briefly described as follows:

An automobile is driven upon the testing machine and anchored thereon by use of the fastening means 48. The motor 28 is started and the treads 30 put into motion, thereby spinning the wheels of the automobile. The brakes of the automobile wheels are then applied, thus tending to arrest the motion of the treads. The resistance offered to the brakes working against the driving motor of the testing machine will be shown by the tendency of the unit to move, that is, to push or pull within the main frame, as the case may be, thereby exerting a certain amount of pressure upon the liquid within the hydraulic cylinder 42. This pressure being indicated upon the gages 44 will permit a determination of the exact braking power of the wheel. By comparison of the various gages, the braking mechanism may be adjusted and equalized in such way that an exactly balanced braking effect is obtained. The simplicity of the device, the ease with which it may be operated, the lack of complicated mechanism which is liable to get out of order, and the effectiveness with which brakes may be exactly tested and adjusted make the device an improvement over all prior devices of this sort.

Although we have shown and described a preferred embodiment of our invention, it is to be understood that changes as to the form, parts, arrangement, and minor details may be made within the scope of the appended claims without departing from the spirit, or sacrificing any of the advantages, of the invention.

Having described our invention, what we claim as new and desire to secure by Letters Patent of the United States is:

1. A testing machine for vehicles, comprising a support, a frame movably mounted upon this support, a treadmill mounted in said movable frame and adapted to support one wheel of the vehicle, driving means for the treadmill, a cylinder, a piston in said cylinder and connected to said movable frame to move therewith, and a gage for indicating the pressure within said cylinder.

2. A brake testing machine for vehicles, comprising a plurality of units, each unit comprising a movable frame, a treadmill in said frame, driving means for said treadmill, a fluid pressure cylinder, a piston within the cylinder, means connecting the piston and movable frame together, and a pressure indicating means for indicating the pressure within said cylinder.

3. A brake testing machine for vehicles, comprising a stationary frame, wheel guides positioned upon said frame, a movable frame mounted in said stationary frame, a treadmill mounted in said movable frame, means for driving said treadmill, a fixed support for the upper reach of said treadmill, roller bearings positioned between said stationary frame and said movable frame, roller bearings on the treadmill and engaging said support, a cylinder, a piston in said cylinder and connected to said movable frame, a gage for indicating the pressure with said cylinder, and means for securing said vehicle upon the machine.

4. A brake testing machine for vehicles, comprising a stationary frame, wheel guides positioned upon said frame, a movable frame mounted in said stationary frame, a treadmill mounted in said movable frame, driving means for said treadmill comprising an electric motor and sprocket chain reduction gearing mounted within said treadmill, a support for the upper reach of said treadmill mounted within said treadmill, roller bearings positioned between said stationary frame and said movable frame, roller bearings on the treadmill and engaging said support, a cylinder, a piston in said cylinder and connected to said movable frame, a gage for indicating the pressure with said cylinder, and means for securing said vehicle to the machine.

5. A brake testing machine for vehicles, comprising a plurality of units, each unit comprising a movable frame, a member movably mounted in said frame and presenting an endless path along which a vehicle wheel may be caused to roll, the path and the two movements being in parallel planes, means for moving said member to produce such rolling of the wheel and also a reactive movement of the frame, fluid pressure means controlled by such reactive movement of the frame to produce pressure proportional to such movement, and means responsive to such pressure for indicating the amount thereof.

In testimony whereof we affix our signatures.

FABIAN E. MACABEE.
EDWARD L. MACABEE.